April 21, 1964 J. J. MILLER 3,129,660

PORTABLE IMPRINTING DEVICE

Filed March 22, 1961 2 Sheets-Sheet 1

INVENTOR.
JOHN J. MILLER
BY Price & Heneveld
ATTORNEYS

April 21, 1964 J. J. MILLER 3,129,660

PORTABLE IMPRINTING DEVICE

Filed March 22, 1961 2 Sheets-Sheet 2

INVENTOR.
JOHN J. MILLER
BY Price & Heneveld
ATTORNEYS 3,129,660
Patented Apr. 21, 1964

3,129,660

PORTABLE IMPRINTING DEVICE

John J. Miller, 3110 Dorais Drive NE., Grand Rapids, Mich.

Filed Mar. 22, 1961, Ser. No. 97,682
2 Claims. (Cl. 101—103)

This invention relates to a recording device, and more particularly to a portable pocket-sized recording device.

There are innumerable situations where it is necessary for individuals to record data throughout the course of a day. This is true regarding all phases of recording, and applies to individuals in practically every type of occupation. The most common manner of keeping a record which is readily portable is still by writing things down with a pencil on a small memo pad or sheet of paper. The obvious disadvantage of such a recording system is that the memo pad or sheet readily becomes misplaced or lost. A further disadvantage is that such a record is not permanent and is therefore not available for reference purposes. Still another disadvantage of this type of recording is that it is necessary to carry some kind of a writing instrument such as a pen or pencil.

Although many recording instruments which overcome the above problems are presently available, they are as a general rule of such a size that they are not readily portable. Furthermore, they usually involve complicated mechanism which is expensive to manufacture and maintain. Thus, in the practical sense, they are not portable, and due to their size and expense are not readily adaptable to the memo-type recordation practiced by the average individual.

The present invention is completely portable in that it is pocket-size, thus overcoming a major problem of recording devices. The present invention can be used as a wallet attachment, a purse accessory, with a pocket secretary, and with many other similar devices. Therefore, the recording device of this invention is portable in the fullest sense of the word. On the other hand, it is large enough so that it does not become easily misplaced.

The recording device of this invention is of simple design and is therefore economical to manufacture and maintain. Also, due to its simplicity it is simple to operate requiring no special skill. Thus, the device is particularly adapted for use by a housewife, a salesman, a factory worker, as well as by persons in many other occupations.

Since the device has a printing mechanism, it makes a permanent record which can be filed and readily used for future reference.

It is therefore an object of this invention to provide a recording device which is highly portable.

Still another object of this invention is to provide a recording device which requires no special skill to operate.

Still another object of this invention is to provide a recording device which is of simple construction and is therefore economical to manufacture and maintain.

Yet another object of this invention is to provide a recording device which will make a permanent record for future reference.

Another object of this invention is to provide a recording device which can be utilized to record various types of records.

These and other objects and advantages of this invention will become more apparent upon reading the specification in conjunction with the accompanying drawings.

Basically, this invention relates to a pocket-sized recording device. It has a rectangular-shaped platen which is formed from a thin sheet of rigid material. The side edges of the platen are rolled upwardly and inwardly and assume a position over the top of the platen. Guide lips are formed from the platen and positioned adjacent the rolled edge on one side. Retainer tabs are also formed from the platen and positioned adjacent the other rolled edge. The one rolled edge and the guide lips cooperate to act as guide surfaces, and slidably receive the slide of a marker. The marker also includes a slide block and print strip both of which are affixed to the slide. The print strip has anchor fingers located at the end thereof and print fingers positioned between the anchor fingers. Type is attached to or formed on the print fingers. An inked ribbon is fixed to the anchor fingers and underlies the type. The retainer tabs and the other rolled edge of the platen cooperate to form other guide surfaces which slidably receive the edges of a paper carrying carriage. The paper carried by the carriage may be moved parallel to the marker, or the marker moved parallel to the paper. A slot is cut in the platen through which the paper may move transversely with respect to the carriage or marker.

Modifications of the invention provide for various forms of the marker structure.

The recording device assembly is designated generally as 10. The assembly includes the platen 12, the paper carrier 22, the marker 30, and inked ribbon 40.

Figures 1, 2:
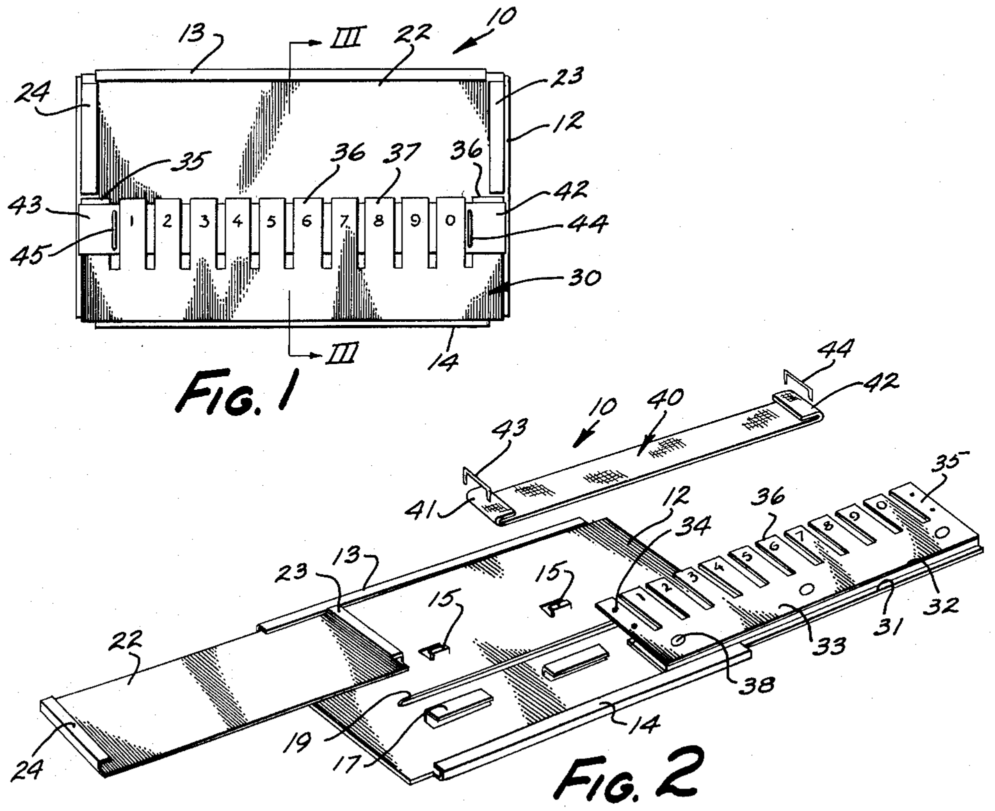
FIG. 1 is a top plan view of the recording device of this invention.
FIG. 2 is an exploded perspective view of the recording device.
Figure 3:
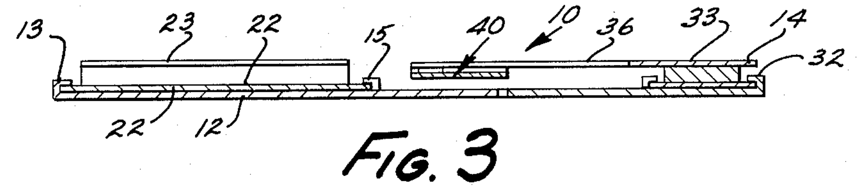
FIG. 3 is a cross-sectional view taken along the section lines III—III of FIG. 1.

Referring more specifically to the details of the invention, FIGS. 1 and 2 best show the platen, now to be described.

The platen 12 is an elongated rectangular-shaped member about the size of a conventional pocket-size memo pad. It may be constructed from sheet metal, plastic or any other easily formable or moldable material. The side edges of the platen are turned upwardly and inwardly to form rolled edges 13 and 14. These edges extend throughout substantially the entire length of the platen.

Located along an imaginary central longitudinal axis is a series of retainer tabs 15. The tabs 15 may be formed from the platen and project upwardly from and toward the rolled edge 13. The retainer tabs 15 cooperate with the rolled edge 13 to form guide means for the paper carrier 22 to be explained more fully hereinafter. The retainer tabs 15 are spaced at intervals such that at least two of the tabs are in engagement with the carriage 22 at all times during normal operation.

Guide lips 17 are also formed from the platen 12 and project upwardly and toward the rolled edge 14. They are spaced inwardly and along a line parallel to the rolled edge 14. The guide lips 17 cooperate with the rolled edge 14 to provide a guide means for the marker 30.

An elongated slot 19 is formed through the platen 12. It is located between the retainer tabs 15 and guide lips 17. It extends throughout substantially the entire length of the platen. It receives paper carried by the carriage 22, and provides a means whereby the paper can be moved transversely with respect to the marker.

The carriage 22 is a flat rectangular-shaped member. It is of a width such that the side edges thereof underlie the retainer tabs 15 and rolled edge 13. The ends of the carriage are turned up and over to form skirts 23 and 24.

The corners of the skirts 23 and 24 are cut away so that they will not interfere with the retainer tabs 15 and rolled edge 13 when the carriage slides longitudinally along the platen. Paper is slid under the skirts 23 and 24 and maintained in position thereby. Since the skirts 23 and 24 surround the ends of the paper, the paper is moved with the carriage when it is moved longitudinally. However, the paper is free to move transversely with respect to the sliding direction of the carriage and pass through the slot 19.

The marker 30 includes a slide member 31 which is a flat strip. The slide 31 is of a width such that the side edges thereof underlie the guide lips 17 and rolled edge 14. The side edges of the slide member may be scalloped to facilitate longitudinal movement of the slide along the guideway formed by the rolled edge 14 and guide lip 17.

A slide block which has a width substantially less than the distance between the rolled edge 14 and guide lips 17 is carried by the slide member 31. It is nothing more than a rectangular block which is utilized to position the print strip above the platen.

The print strip 33 is carried by the slide block 32. The slide 31, slide block 32, and print strip 33 are all connected together by rivets 38 to form a single unit. The print strip 33 is of substantial width. It is fastened to the slide block 32 along one side thereof, and the remaining portion overlies the platen 12.

Portions of the print strip which overlie the platen are removed to form anchor fingers 34 and 35, and a plurality of print fingers 36. The anchor fingers 34 and 35 are formed at the opposite ends of the print strip. There are ten intermediate print fingers 36 which are placed at equally spaced intervals throughout the distance between the anchor fingers.

The print strip 30 is made from material which is inherently resilient, and the print fingers are also crimped to increase their resiliency and for placing the printing indicia in the same plane as platen when the print finger is flexed. When the print fingers 36 are pressed into engagement with the platen they will return automatically to a rest position above the platen due to their inherent resiliency.

The ends of the print fingers are impressed with some type of indicia. For purposes of illustration, the fingers are shown with the numbers 1 through 9 and 0, there being ten print fingers. It is to be understood that within the broadest aspect of the invention other symbols or marks may be applied to the fingers.

The ribbon 40 underlies the print fingers 36. The ribbon 40 has loops 41 and 42 formed at opposite ends thereof. A loop may be formed by folding over the end of the ribbon and stapling it. The ribbon may be formed from a piece of a conventional typewriter ribbon. The ribbon is fixed in position by sliding the loops over the anchor fingers 34 and 35. When the print fingers are depressed, the impression formed in the particular print finger will engage the inked ribbon and imprint the indicia carried thereby on the paper.

Figure 6:
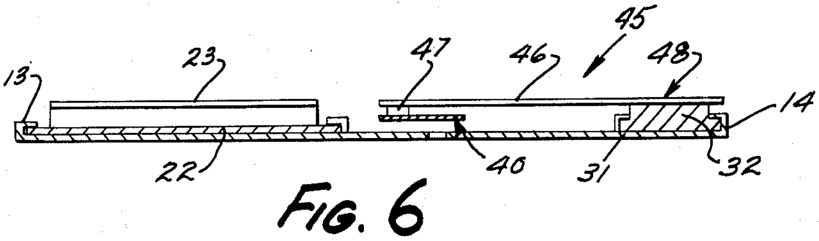
FIG. 6 is a cross-sectional view of another modified form of the invention.

FIG. 6 shows a modified form of the invention designated generally as 45. The modification 45 is similar to the assembly 10 except for certain features of the marker. Therefore, only these features will be explained in detail.

The marker of assembly 45 is designated as 48. It includes a slide and slide block similar to the slide member 31 and slide block 32. In the marker 48 there is no print strip, but individual resilient keys 46 secured to the slide block. The keys are positioned at spaced intervals throughout the length of the slide block. Type is fixed to the underside of each of the keys adjacent the ends thereof which overlie the platen. The type bears the proper indicia. Anchor keys are positioned at the ends to receive the ribbon 40 which underlies the type.

Figure 4:
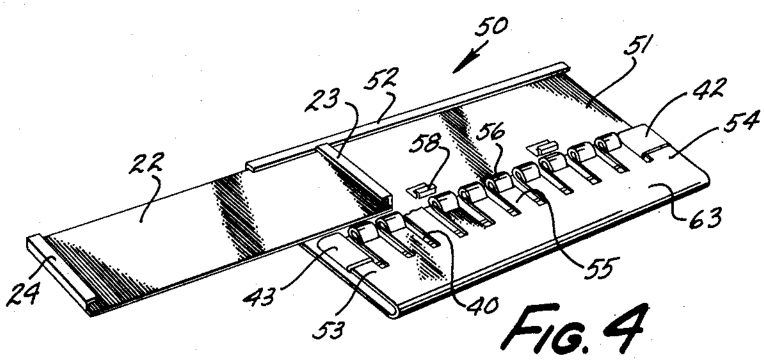
FIG. 4 is a perspective view of a modified form of the invention.
Figure 5:
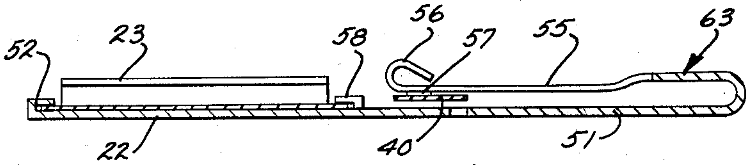
FIG. 5 is a cross-sectional view of the modification shown in FIG. 4.

FIGS. 4 and 5 show still another modified form of the invention designated generally as 50. The assembly 50 has a platen 51. It is generally similar in shape to the platen 12 having a rolled edge 52 and retainer tabs 58 which are similar to the rolled edge 13 and retainer tabs 15. The rolled edge 52 and retainer tabs 58 act as a guideway to receive a carriage 22.

The assembly 50 differs in the construction of the marker 63. The marker 63 is formed from the platen itself. The side of the platen opposite the rolled edge 52 is turned upwardly and over the platen. The anchor fingers 53 and 54, and the print fingers 55 are then formed from the edge of the platen. The ends of the print fingers 55 are reversely bent to form keys 56. Type 57 is affixed to the underside of the print fingers 55 directly under the keys 56. The type bears the desired indicia.

A ribbon similar to the ribbon 40 is affixed to the anchor fingers and underlies the type 57.

Figure 7:
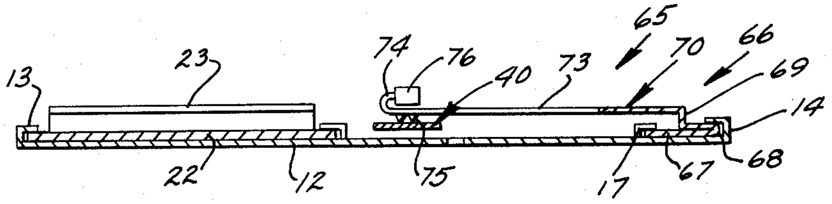
FIG. 7 is a cross-sectional view of still another modification of the invention.
Figure 8:
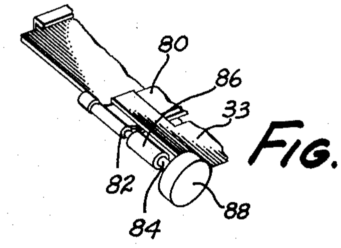
FIG. 8 is a fragmentary perspective view of a modified form of ribbon mounting.

FIG. 7 shows still another modified form of the invention designated generally as 65. The assembly 65 has a platen which is similar in design to the platen 12, therefore, this structure will not be explained in detail. The modification 65 differs from the assembly 10 in that the marker structure, designated generally as 36, is constructed from a single piece of material.

The marker 66 is formed from a flat, rectangular piece of material. The one edge of the material forms the slide 67. A loop 68 is then formed in the material which is folded back to the center of the slide 67. The material is then bent transversely to form connector 69. The material is again bent transversely in the opposite direction forming the print strip 70 which overlies the platen. Anchor fingers are formed on the ends of the print strip 70, and print fingers 73 intermediate the anchor fingers. The ends of the print fingers are reversely bent to form keys 74. The marker is thus formed from a single piece of metal.

The print fingers may be provided with impressions or with type 75. The keys 74 may also be provided with characters 76 which identify the type. The loops of ribbon 40 engage anchor fingers which retain the ribbon in position under the type or impressions.

*Modification*

In place of the single ribbon 40 with overlapping ends 41, 42 shown in FIG. 1, an endless ribbon 80 may be used. In that case, the ribbon 80 may be trained over a roller 82 which may be knurled if necessary. The roller 82 may be affixed to a shaft 84 journalled on a bearing 86 formed by rolling a tab formed on the end of print strip 33, and provided with a knob 88 for turning the roller 82 so as to advance the ribbon 80. Thus, the ribbon 80 may be moved from time to time so as to present a new inked surface to the keys 36.

*Operation*

The operation of the recording device 10 is extremely simple. The carriage 22 is provided with a paper or card which may have various forms of printed matter thereon to suit the particular type of recording desired. For example, the paper may be printed for recording the expenses of a salesman. The paper would then have listed items such as gasoline expense, oil expense, lodging expense, meal expense and various similar items common to an expense account. These items may be listed vertically from the top to the bottom of the paper. It also may be desirable to list the days of the week across the top of the paper. The paper may be lined to form columns for easy reference.

If the salesman spends $3.00 for gasoline, the marker is moved longitudinally until the print finger bearing the impression "3" is aligned with the gasoline column on the paper. If it is a particular day of the week, the paper is moved transversely until the particular day is aligned with the impressions on the print fingers. The print finger is then depressed and the number "3" will be imprinted on the paper. The salesman then has a record that he has spent $3.00 for gasoline on, say, Monday.

If it is desired to keep track of the expenses in dollars and cents, the above procedure is followed. However, if the item is, for example, 34¢, the marker and paper are aligned as before and the figure "3" imprinted; however, since the carriage 22 is also slidable, it can be moved slightly so that the impression "4" is placed adjacent the imprint "3." The print finger can then be depressed to complete recording the item of 34¢.

The modifications 45 and 65 operate in a similar manner to the assembly 10.

The modification 50 operates differently since the marker 63 is stationary. With this arrangement it is necessary to move the carriage 22 to align the proper item on the paper with the proper print finger.

From the above description it can be seen that the invention disclosed herein is formed from a minimum number of parts which are economical to construct and manufacture. The device is extremely simple to operate and provides a permanent record. The recording device is portable in the fullest sense of the word; however, it is of sufficient size that it does not become easily misplaced. It is convenient to use, and since it contains its own printing mechanism does not require the user to carry a pencil or some other writing object.

It can be used as an accessory to many articles commonly carried by the user. These items include a wallet, a purse, a billfold, a money holder, a pocket secretary, and other similar items. Depending upon the impressions placed on the print fingers, and the printed matter on the paper, the recording device can be used to record various things. Some of these uses include the recording of expenses, recording time, imprinting an identifying symbol, and various other applications such as score cards or inventory control.

It is also within the scope of the invention to provide the recording device with a roll of paper which can be continuously fed transversely through the carriage and slot.

While a preferred embodiment of this invention and modifications thereof have been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. A recording device comprising: platen means having rolled side edges; guide lips formed from said platen inwardly of one of said rolled side edges; a marker including a slide block and slide; said slide having edges received by said guide lips and one rolled edge and being slidably guided thereby; said marker also including a print strip having print fingers; indicia impressions formed in said print fingers; an endless inked ribbon underlying said indicia impressions; retainer tabs formed from said platen and cooperating with said other rolled edge to slidably receive a carriage; said carriage carrying paper positionable under said print fingers; said print fingers being flexible to imprint indicia on said paper; and said platen having a slot therein so positioned that said paper may be passed from an imprinting area on said platen through said slot and underneath said slide block to permit unlimited transverse movement of said paper.

2. A recording device comprising: platen means having a rolled side edge; guide lips formed from said platen inwardly of said rolled side edge; a marker including a slide, said slide having edges received by said guide lips and said rolled edge and being slidably guided along said platen means thereby in a direction parallel to said rolled side edge; said marker also including a print strip having print fingers; indicia impressions formed in said print fingers; an endless inked ribbon between said print fingers and said platen means; rectangular record paper under said print fingers; retainer means on said platen and cooperating to slidably receive said paper under said print fingers with the paper edges parallel to said rolled edge; said print fingers being flexible to imprint indicia on said paper; and said platen having a slot therein parallel to said rolled side edge and so positioned that said paper may be passed from an imprinting area on said platen under said fingers through said slot and underneath said slide to permit movement of said paper in a direction transverse to the direction of slidable movement of said slide and transverse to said rolled edge.

References Cited in the file of this patent

UNITED STATES PATENTS

| | | |
|---|---|---|
| 20,081 | MacElheran | Apr. 27, 1858 |
| 592,533 | Rogers et al. | Oct. 26, 1897 |
| 764,342 | Booth | July 5, 1904 |
| 932,575 | Quigley | Aug. 31, 1909 |
| 1,100,183 | Hohmann | June 16, 1914 |
| 1,159,617 | Talley | Nov. 9, 1915 |
| 2,392,488 | MacCallum | Jan. 8, 1946 |
| 2,621,998 | Lewis | Dec. 16, 1952 |
| 2,689,520 | Katz | Sept. 21, 1954 |
| 2,793,153 | Grundel | May 21, 1957 |

FOREIGN PATENTS

| | | |
|---|---|---|
| 445,588 | Italy | Feb. 18, 1949 |